(12) United States Patent
Avalur Nagarajan

(10) Patent No.: US 11,285,757 B2
(45) Date of Patent: Mar. 29, 2022

(54) SADDLE LOCK RING FOR REAR DUAL WHEELS OF HEAVY TRANSPORT VEHICLE

(71) Applicant: WHEELS INDIA LIMITED, Chennai (IN)

(72) Inventor: Balaji Avalur Nagarajan, Chennai (IN)

( * ) Notice: Subject to any disclaimer, the term of this patent is extended or adjusted under 35 U.S.C. 154(b) by 291 days.

(21) Appl. No.: 15/752,258

(22) PCT Filed: Sep. 29, 2016

(86) PCT No.: PCT/IB2016/054558
§ 371 (c)(1),
(2) Date: Feb. 13, 2018

(87) PCT Pub. No.: WO2017/203333
PCT Pub. Date: Nov. 30, 2017

(65) Prior Publication Data
US 2020/0055332 A1   Feb. 20, 2020

(30) Foreign Application Priority Data

May 23, 2016   (IN) .............................. 201641017656

(51) Int. Cl.
*B60B 25/18* (2006.01)
*B60B 25/04* (2006.01)
(Continued)

(52) U.S. Cl.
CPC .............. *B60B 25/18* (2013.01); *B60B 11/06* (2013.01); *B60B 25/045* (2013.01); *B60B 25/10* (2013.01);
(Continued)

(58) Field of Classification Search
CPC ....... B60B 11/06; B60B 11/02; B60B 25/045; B60B 25/10; B60B 25/14; B60B 25/18; B60B 25/22; B60B 25/08
See application file for complete search history.

(56) References Cited

U.S. PATENT DOCUMENTS 2,835,303 A * 5/1958 Woodward .............. B60B 25/22
152/410
3,121,455 A * 2/1964 Scott ...................... B60B 25/22
152/427

(Continued)

*Primary Examiner* — Kip T Kotter

(57) ABSTRACT

The present invention relates to a novel design for quick tyre change in rear dual wheel assembly in a heavy transport vehicle. The invention provides a safe design that comprises a two-piece segmented saddle lock ring retained in position by an endless ring. A self-locking taper provided on the inside of endless ring can be pressed against the taper provided on the two-piece segmented saddle lock ring. The endless ring retaining the two-piece segmented saddle lock rings due to wedge action of self-locking taper cannot move from its position until an external force is applied on the endless ring towards the direction of the tyre position. The endless ring acts as a hood over the two-piece segmented saddle lock rings and prevents any loose parts flying off the rim during the tyre burst. Further in this safe design both inboard and outboard rim tyre support components are identical as both rims are of same diameter.

5 Claims, 6 Drawing Sheets

(51) Int. Cl.
    *B60B 25/10*         (2006.01)
    *B60B 11/06*         (2006.01)
    *B60B 11/00*         (2006.01)
    *B60B 25/14*         (2006.01)
    *B60B 11/02*         (2006.01)
    *B60B 25/08*         (2006.01)
    *B60B 25/22*         (2006.01)

(52) U.S. Cl.
    CPC .............. *B60B 11/00* (2013.01); *B60B 11/02* (2013.01); *B60B 25/08* (2013.01); *B60B 25/14* (2013.01); *B60B 25/22* (2013.01); *B60B 2320/10* (2013.01); *B60B 2900/541* (2013.01)

(56) References Cited

U.S. PATENT DOCUMENTS

| | | | | |
|---|---|---|---|---|
| 4,554,961 | A * | 11/1985 | Osawa | B60B 25/04 |
| | | | | 152/410 |
| 4,721,142 | A * | 1/1988 | Foster | B60B 25/18 |
| | | | | 152/410 |
| 5,083,597 | A * | 1/1992 | France | B60B 25/14 |
| | | | | 152/410 |
| 2002/0149256 | A1* | 10/2002 | McNeil | B60B 11/06 |
| | | | | 301/35.628 |
| 2003/0140998 | A1* | 7/2003 | Oba | B60B 25/14 |
| | | | | 152/410 |
| 2010/0164275 | A1* | 7/2010 | Oba | B60B 25/20 |
| | | | | 301/9.1 |
| 2013/0140875 | A1* | 6/2013 | Cragg | B60B 25/045 |
| | | | | 301/36.1 |
| 2014/0292060 | A1* | 10/2014 | Phillis | B60B 15/00 |
| | | | | 301/41.1 |

* cited by examiner

SADDLE LOCK RING FOR REAR DUAL WHEELS OF HEAVY TRANSPORT VEHICLE

FIELD OF INVENTION

The embodiment herein generally relates to a dual wheel rim assembly in heavy transport vehicles. Specifically, the invention relates to an improved dual wheel rim assembly provided with a two-piece segmented saddle lock ring retained in position by an endless ring which permits for changing the inboard tyre of dual wheel rim assembly quickly without removing the outboard wheel rim assembly.

BACKGROUND AND PRIOR ART

Dual wheel assemblies are used on rear, driving and non-steering axles of heavy transport vehicles, such as mining and earthmoving vehicles, to increase their load bearing capacity and help maintain vehicle drivability. A typical dual wheel assembly comprises a pair of adjacent wheel rims mounted on a common hub with each wheel rim fitted with an identical tyre. Even though the dual wheel rims are used in heavy transport vehicles, changing the tyre of the inboard wheel of the dual is a laborious and time-consuming process.

In order to reduce the time consumption and labor requirement, it is known from the U.S. Pat. No. 6,568,764 heavy transport vehicles utilize dual wheel assemblies in which the outboard wheel rim is provided with a smaller diameter than that of the inboard wheel rim. The smaller diameter of outboard wheel rim enables the inboard tyre and removable tyre support components to pass over the outboard wheel rim and thereby enabling the removal and assembly of the inboard tyre without removing the outboard wheel rim. When the dual wheel rims are mounted onto the vehicle, inboard is defined as the direction facing towards the centre of the vehicle and outboard is defined as the direction facing away from the vehicle.

There are some difficulties in having different diameters for the wheel rims. Firstly, the tyre support components are different and are not interchangeable between inboard and outboard rims which pose difficulty in spares inventory management. Tyre support components typically comprise a tyre bead seat band, tyre wall support flange or tyre flange. Secondly, the structural and geometric design of final planetary drive are constrained by the smaller outboard wheel rim diameter which may ultimately impacts the gear reduction. Thirdly the alignment of tyre and tyre support components of the inboard wheel at on-site conditions while refitting procedure is difficult as the tyre and tyre support components after having moved over the smaller diameter of the outboard rim have to be aligned with the larger inboard wheel rim.

There is another design known to those familiar in the art as double gutter design. In such designs, the inner lock ring of outboard wheel rim is of two-piece segmented type. These two-piece lock rings are held together by use of fasteners.

Therefore, there is a need for a lock ring mechanism which does not require any additional fasteners to hold the wheel rim. Further, the wheel lock ring must have a self-locking arrangement by which the tyre can be held in the rim. Furthermore, there is a need for an identical wheel assembly for both outboard and inboard wheel rim assembly and also for interchanging the bead seat band between wheels.

OBJECTS OF THE INVENTION

Some of the objects of the present disclosure are described herein below:

A main object of the present invention is to provide a novel locking mechanism to facilitate quick tyre change for inboard wheel rim of rear duals of a heavy transport vehicle without removal of outboard wheel rim.

Another object of the present invention is to provide a novel locking mechanism to facilitate quick tyre change for inboard wheel rim of rear duals of a heavy transport vehicle with a self-locking feature without a need for additional fasteners.

Yet another object of the present invention is to provide a novel locking mechanism to facilitate quick tyre change for inboard wheel rim of rear duals of a heavy transport vehicle with an identical wheel rim assembly for both outboard and inboard.

Another object of the present invention is to provide a novel locking mechanism to facilitate quick tyre change for inboard wheel rim of rear duals of a heavy transport vehicle with identical wheel assembly to facilitate interchanging the bead seat bands between wheel rims.

The other objects and advantages of the present invention will be apparent from the following description when read in conjunction with the accompanying drawings, which are incorporated for illustration of preferred embodiments of the present invention and are not intended to limit the scope thereof.

SUMMARY OF THE INVENTION

In view of the foregoing, an embodiment herein provides a novel locking mechanism in wheel rim assembly, which facilitates quick tyre change for inboard of rear duals of a heavy transport vehicle. The embodiments herein achieve this by providing a two-piece segmented saddle lock ring retained in its position on the wheel rim by an endless ring, which can be used in dual wheel assembly of heavy transport vehicles.

In accordance to an embodiment, removal and assembly of the tyre to the inboard wheel rim of the dual rear wheel in heavy transport vehicle can be performed without removing outboard wheel rim assembly. Further, the necessity of de-torquing and torquing of a large number of wheel fasteners are also not required. The novel locking mechanism comprises a two-piece segmented saddle lock ring retained in its position on the wheel rim by an endless ring in the inner portion of the outboard wheel rim and a conventional split lock ring in the outer portion of the outboard wheel rim of rear dual wheel rim assembly of the heavy transport vehicle. According to the shape of the lock ring, gutter section or groove in the inner portion of the outboard wheel is designed. The outer portion of the inboard wheel rim is provided with conventional lock ring and the inner portion of the inboard wheel rim of the rear dual is usually provided with a lock ring integral to the rim base. During inflation, the tyre expands and thereby pushing the tyre support components namely the bead seat bands so that they abut against the respective lock rings. A taper of 45 degrees in the bead seat band on the inner portion of the outboard wheel abuts against the matching taper provided on the external surface of the endless ring. The taper provided on the inside of the endless ring is pressed against the taper provided on the two-piece segmented saddle lock ring. The taper is a self-locking type and the half angle of the conical frustum with respect to wheel rim axis may vary depending on the wheel size, torque and other tribological conditions. In the event of any tyre burst, only the bead seat band which has conjoined with the tyre may move away from the 45-degree taper butting surface of the endless ring towards the inside of the rim. The endless ring retaining the two-piece segmented saddle lock rings due to wedge action of self-locking taper cannot move from its position until an external force is applied on the endless ring towards the direction of the tyre. The endless ring may act as a hood over the two-piece segmented saddle lock rings and prevents any loose parts flying off the rim during the tyre burst.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION OF THE PREFERRED EMBODIMENTS

Figure 1:
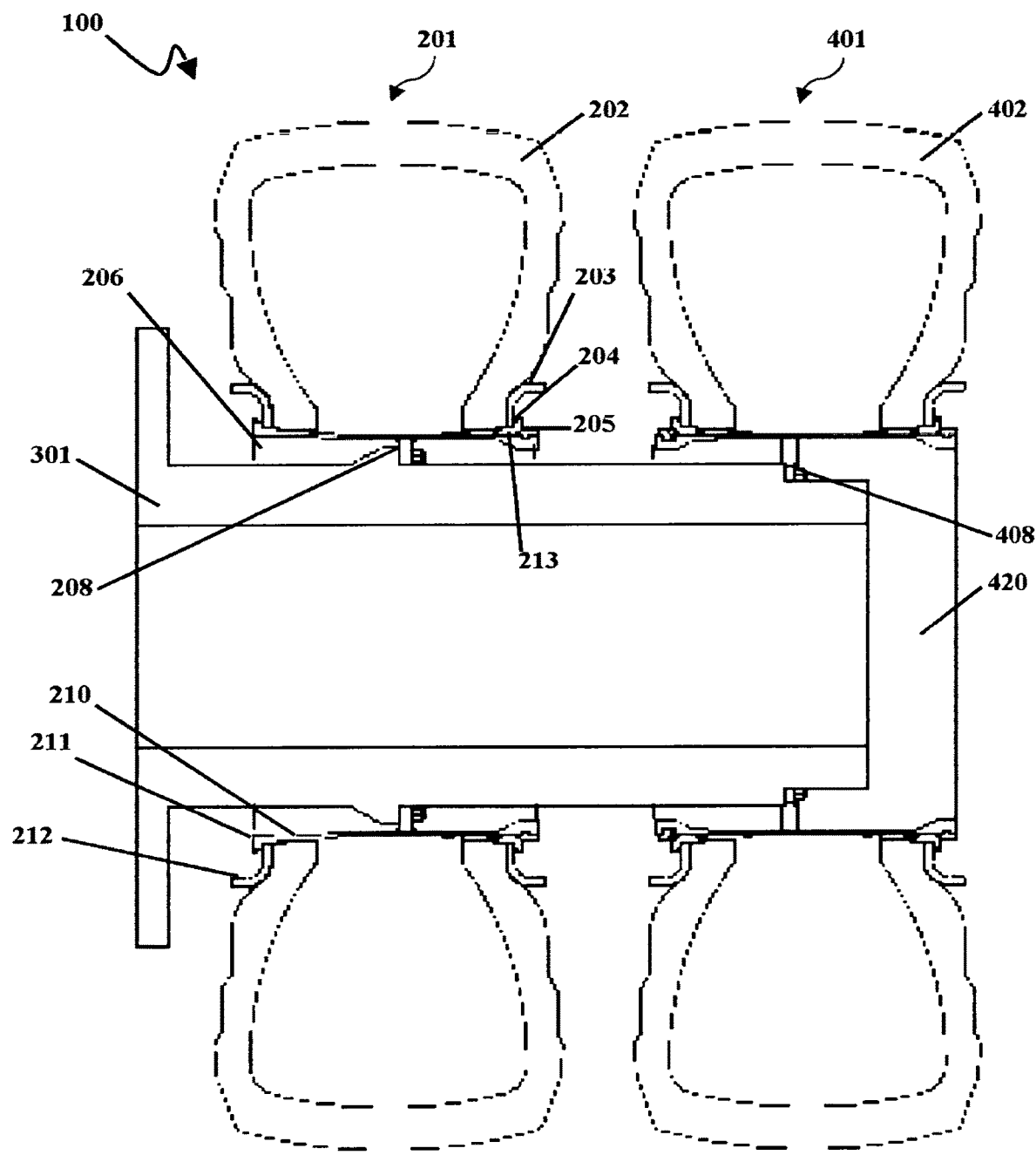
FIG. 1 illustrates a schematic sectional elevation of dual wheel assembly, according to an embodiment therein.

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there is a need for a dual wheel rim assembly, which facilitates quick tyre change for inboard wheel of rear duals of a heavy transport vehicle. The embodiments herein achieve this by providing a two-piece segmented saddle lock ring retained in its position on the wheel rim by an endless ring, which can be used for assembling the wheels of dual wheel assembly in heavy transport vehicles. Referring now to the drawings, FIGS. 1 through 6, where similar reference characters denote corresponding features consistently throughout the figures, there are shown preferred embodiments.

In accordance to an embodiment, removal and assembly of the tyre to the inboard wheel rim of the dual rear wheel in heavy transport vehicle can be performed without removing outboard wheel rim assembly. Further, the necessity of de-torquing and torquing of a large number of wheel fasteners are also not required. The novel locking mechanism comprises a two-piece segmented saddle lock ring retained in its position on the wheel rim by an endless ring in the inner portion of the outboard wheel rim and a conventional split lock ring in the outer portion of the outboard wheel rim of rear dual wheel rim assembly of the heavy transport vehicle. According to the shape of the lock ring, gutter section or groove in the inner portion of the wheel is designed. The outer portion of the inboard wheel rim is provided with conventional lock ring and the inner portion of the inboard wheel rim of the rear dual is usually provided with a lock ring integral to the rim base. During inflation, the tyre expands and thereby pushing the tyre support components namely the bead seat bands so that they abut against the respective lock rings. A taper of 45 degrees in the bead seat band on the inner portion of the wheel abuts against the matching taper provided on the external surface of the endless ring. The taper provided on the inside of the endless ring is pressed against the taper provided on the two-piece segmented saddle lock ring. The taper is a self-locking type and the half angle of the conical frustum with respect to wheel rim axis may vary depending on the wheel size, torque and other tribological conditions. In the event of any tyre burst, only the bead seat band which has conjoined with the tyre may move away from the 45-degree taper butting surface of the endless ring towards the inside of the rim. The endless ring retaining the two-piece segmented saddle lock rings due to wedge action of self-locking taper cannot move from its position until an external force is applied on the endless ring towards the direction of the tyre. The endless ring acts as a hood over the two-piece segmented saddle lock rings and prevents any loose parts flying off the rim during the tyre burst.

FIG. 1 illustrates a schematic sectional elevation 100 of the dual wheel assembly, according to an embodiment. The dual wheel rim assembly for a heavy transport vehicle comprises a pair of wheels 201, 401 that mounted side-by-side on a common axle hub 301. Generally, the wheel 201 has a cylindrical inboard wheel rim 206 on which a tyre 202 is mounted. The inboard wheel rim 206 has a knave 208 that is fixed to the inside thereof having a series of bolt holes spaced circumferentially around an annular flange. The knave 208 is used to mount the inboard wheel rim 206 to a shoulder of the common axle hub 301.

In accordance to an embodiment, the inboard wheel rim 206 has an annular flange 211 at one end thereof which may extend radially outwardly. The portion of the inboard wheel rim 206 adjacent to the end flange 211 is tapered outwardly towards the end flange 211 to form a fixed bead seat band 210 for one bead of the inboard tyre 202. When the inboard tyre 202 fitted to the inboard rim 206, the bead may abut against the annular flange 211. It is common practice to place a tyre flange 212 between the end flange 211 and the inboard tyre 202 to retain and support the inner side wall of the inboard tyre 202, in which case the tyre still abuts against the end flange 211 but indirectly via the inboard tyre flange 212.

Figure 2:
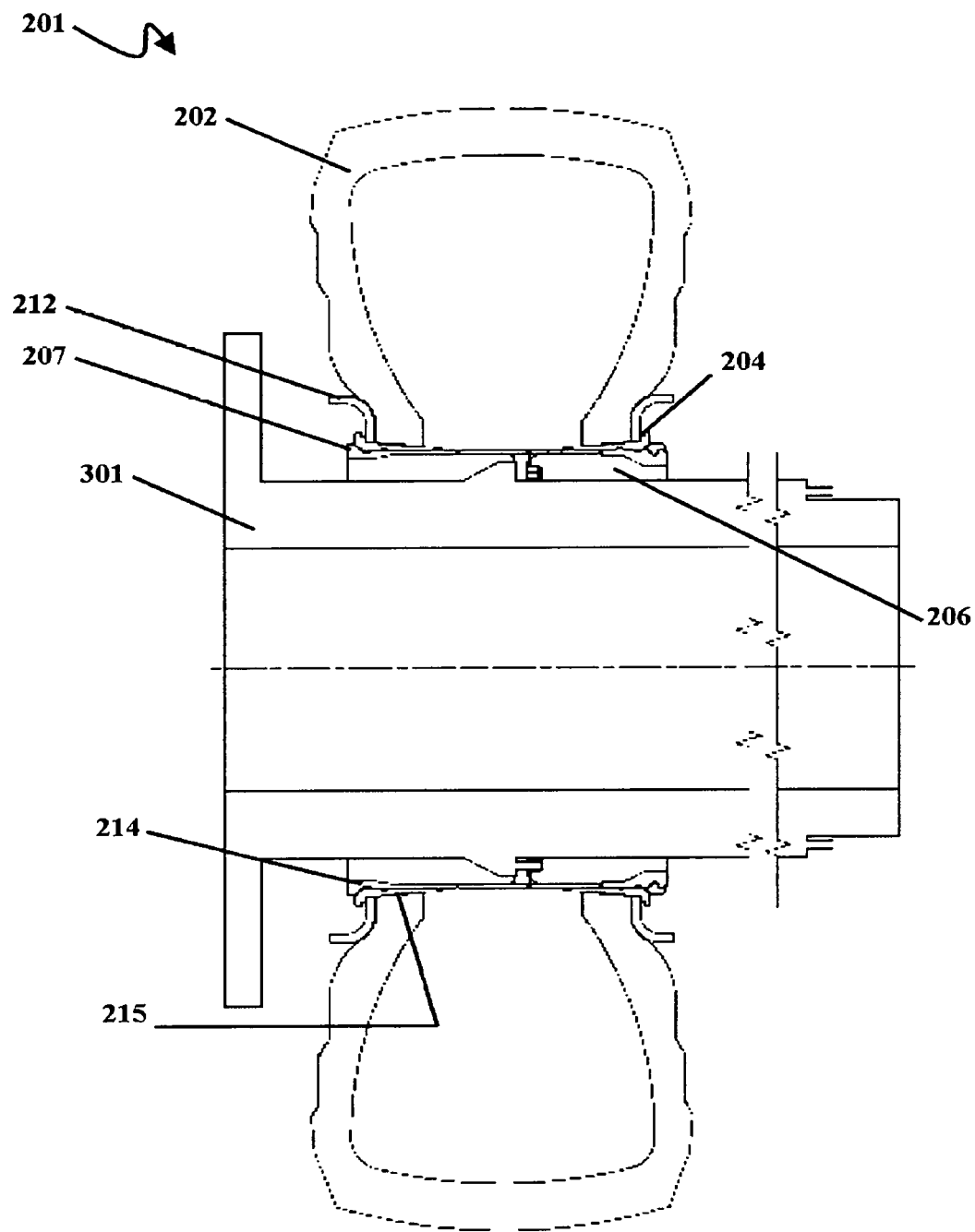
FIG. 2 illustrates an enlarged sectional elevation of inboard wheel rim showing the removable bead seat band of the dual wheel assembly, according to an embodiment therein.

FIG. 2 illustrates an enlarged sectional elevation 201 of inboard wheel rim showing the removable bead seat band of the dual wheel assembly, according to another embodiment. Those familiar in the art can appreciate that the inner end of the wheel is provided with removable bead seat band 215. The removable bead seat band 215 is generally a cylindrical or ring-like member with a tapered thickness which provides a seat for an inner bead of the tyre 202. An O-ring 214 is located in an annular groove on the inboard wheel rim 206 to provide an air tight seal between the removable bead seat band 215 and the inboard wheel rim 206. The tyre flange 212 is mounted on the removable bead seat band 215 to retain and support the inner side wall of the inboard tyre 202. The removable bead seat band 215 is retained in position by the annular flange 207 which extends radially outwardly.

Figure 3:
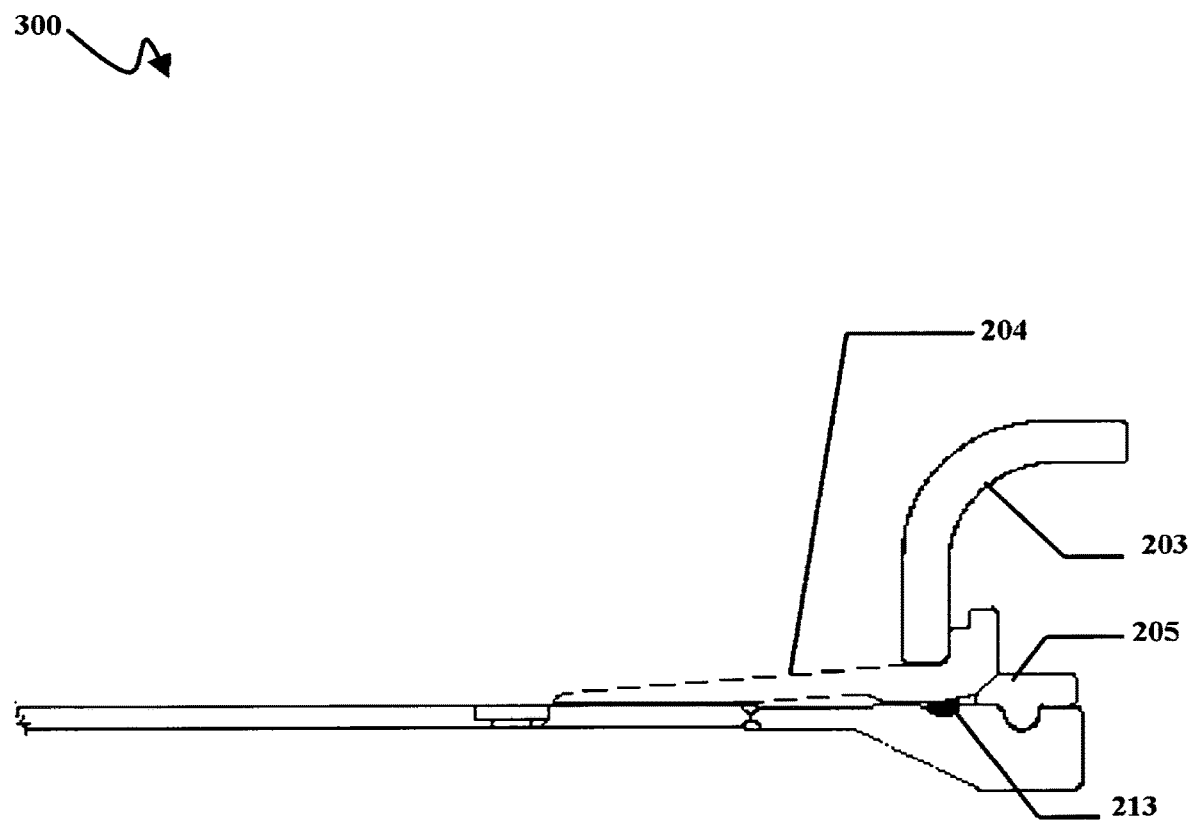
FIG. 3 illustrates an enlarged sectional elevation of outer bead seat band portion of inboard wheel rim of dual wheel assembly, according to an embodiment therein.

FIG. 3 illustrates an enlarged sectional elevation 300 of outer bead seat band portion of the inboard wheel rim of the dual wheel assembly, according to an embodiment. A removable bead seat band 204 is mounted to the outer end of the inboard wheel rim 206. The removable bead seat band at the outer end of the inboard wheel 204 is generally a cylindrical or ring-like member of tapered thickness, which provides a seat for the outer bead of the tyre 202. An O-ring 213 is located in an annular groove on the inboard wheel rim 206 to provide an air tight seal between the removable bead seat band at the outer end of the wheel 204 and the inboard wheel rim 206. Again, a tyre flange 203 at the outer end of the wheel is mounted on the removable bead seat band at the outer end of the wheel to retain and support the outer side wall of the tyre 202. The removable bead seat band at the outer end of the wheel 204 is retained in position, in use, by a split lock ring 205 which has an inner bead which locates in an annular groove around the inboard wheel rim 206. The above-described design and construction of the inboard wheel assembly is known in the art, and need not be further described in detail.

According to an embodiment, generally the outboard wheel 401 may have a cylindrical wheel rim 420 on which an outboard tyre 402 can be mounted. The mounting holes on its knave 408 are circumferentially arranged in a smaller diameter circle for mounting to the smaller outer end of the common axle hub 301. The inboard and outboard tyres 202, 402 are of the same, standard size and may be fitted interchangeably to either inboard or outboard wheel rim 201, 401.

Figure 4A:
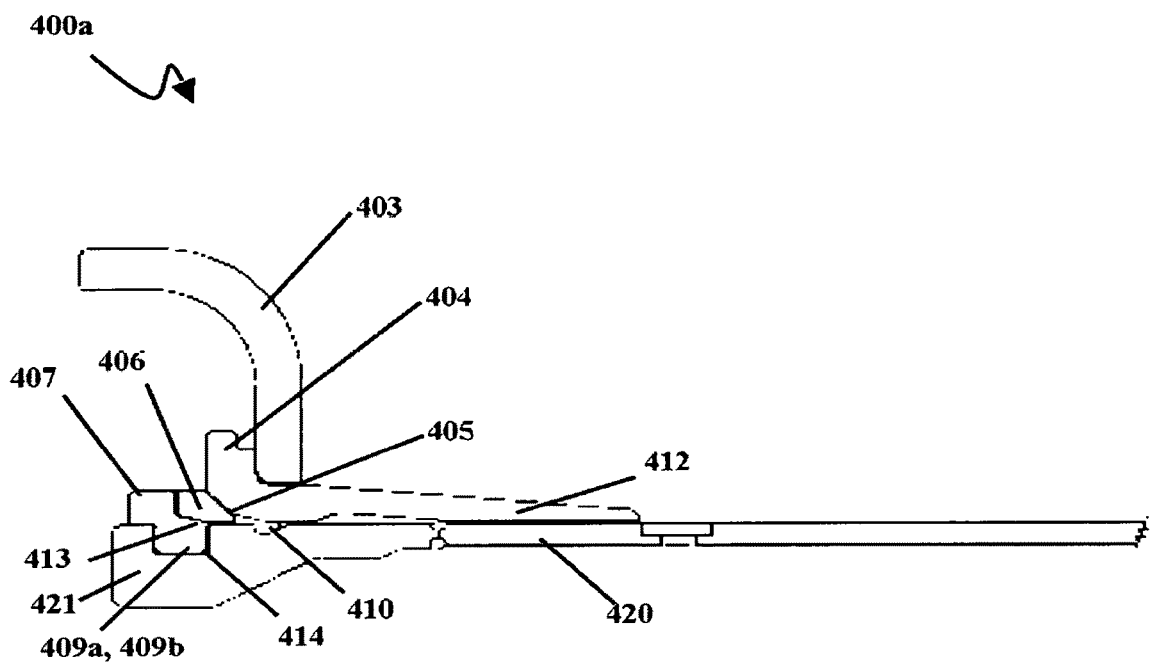
FIG. 4a illustrates of an enlarged sectional elevation of inner bead seat portion of outboard wheel rim of the dual wheel assembly, according to an embodiment therein.

FIG. 4a illustrates of an enlarged sectional elevation 400a of inner bead seat portion of the outboard wheel rim of the dual wheel assembly, according to an embodiment. As with conventional wheel rim, the outboard wheel rim 420 of the wheel 401 is generally of cylindrical shape. Grooves for O-ring and lock rings are machined in the front and rear end of the rim for the purposes described below. The inner end of an outboard wheel rim 420 is provided with an annular groove 414. The two-piece segmented saddle lock ring 409a and 409b are disposed of in the groove. A portion of the two-piece segmented saddle lock rings 409a and 409b is provided with shoulder 407 to ensure seating over the gutter land 421 of the wheel rim 420. This shoulder 407 together with gutter land 421 provides structural support for the lock ring against possible bend loads. A portion of the two-piece segmented saddle lock rings 409a and 409b is tapered outwardly extending towards the tyre side of the outboard wheel rim to form self-locking taper seat 413 for the endless ring 406.

According to an embodiment, the inner side of the endless ring 406 is tapered matching to self-locking taper seat 413 to ensure proper abutment over the two-piece segmented saddle lock rings 409a and 409b or saddle lock ring. A portion of the external surface of the endless ring 406 is tapered to form a seat 405 for the inner bead seat band 412 at the outboard wheel. The inner bead seat band at outboard wheel 412 provides a seat for the inner bead of the tyre 402. The inner bead seat band 412 at the outboard wheel has an annular flange 404 extending radially outwardly. A tyre flange 403 is mounted on the inner bead seat band 412 at the outboard wheel to retain and support the inner wall of the tyre 402. An O-ring 410 is located in the groove on the inner portion of the outboard wheel rim 420 to provide air tight seal between inner bead seat band 412 and outboard wheel rim 420.

Figure 6A:
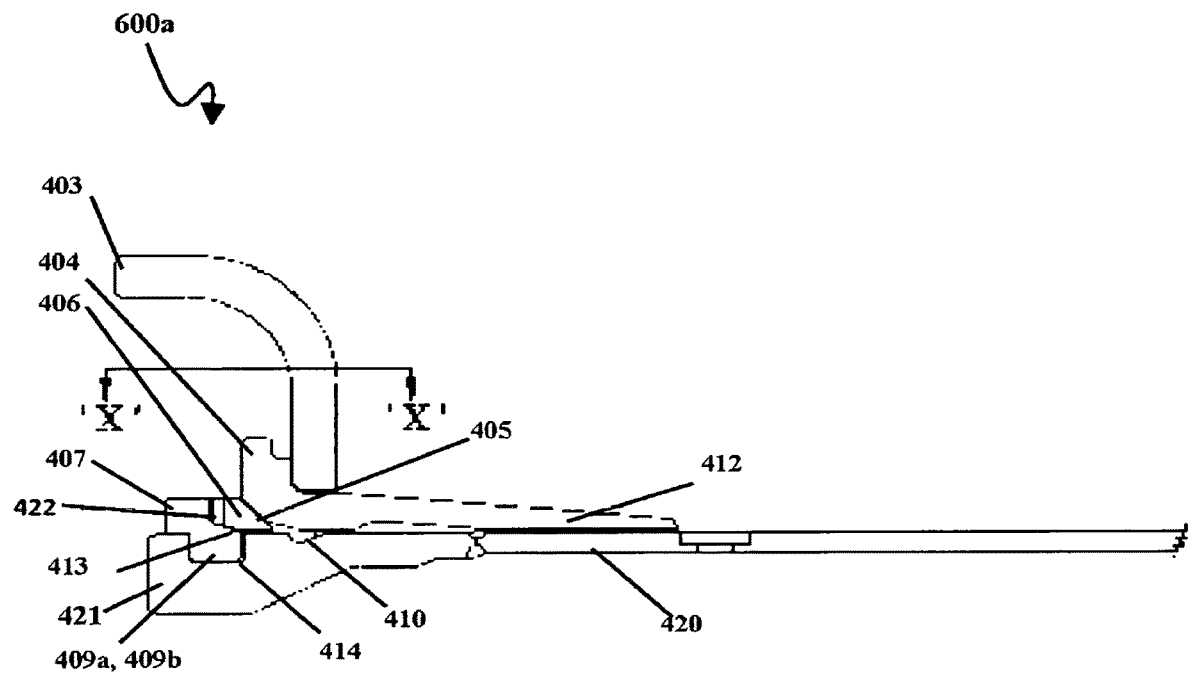
FIG. 6a illustrates the enlarged sectional elevation of inboard locking of outboard wheel rim with prying slots, according to an embodiment therein.
Figure 6B:
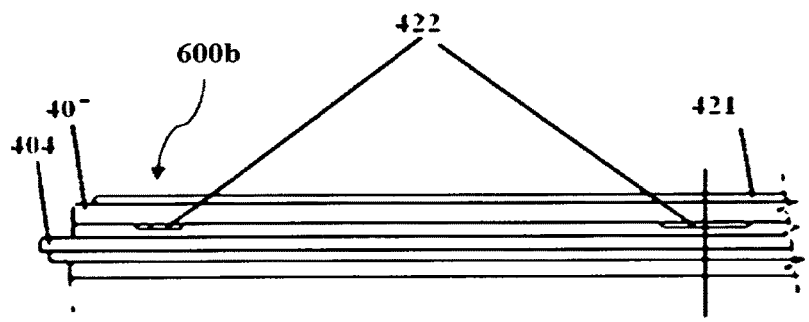
FIG. 6b illustrates the enlarged sectional (XX') elevation of inboard locking of outboard wheel rim with prying slots, according to an embodiment therein.

FIG. 6a illustrates the enlarged sectional elevation 600a of inboard locking of outboard wheel rim with prying slots, according to an embodiment. FIG. 6b illustrates the enlarged sectional elevation XX' 600b of inboard locking of outboard wheel rim with prying slots, according to an embodiment. According to an embodiment, the enlarged sectional cut portion XX' is rotated to 90 degree and the tyre flange portion 403 is removed. According to another embodiment, the endless ring 406 is provided with plurality of prying slots 422 on the face abutting the segmented saddle lock rings 409a and 409b to enable dislodging the endless ring from the wedge locking on the taper of segmented lock rings.

Figure 4B:
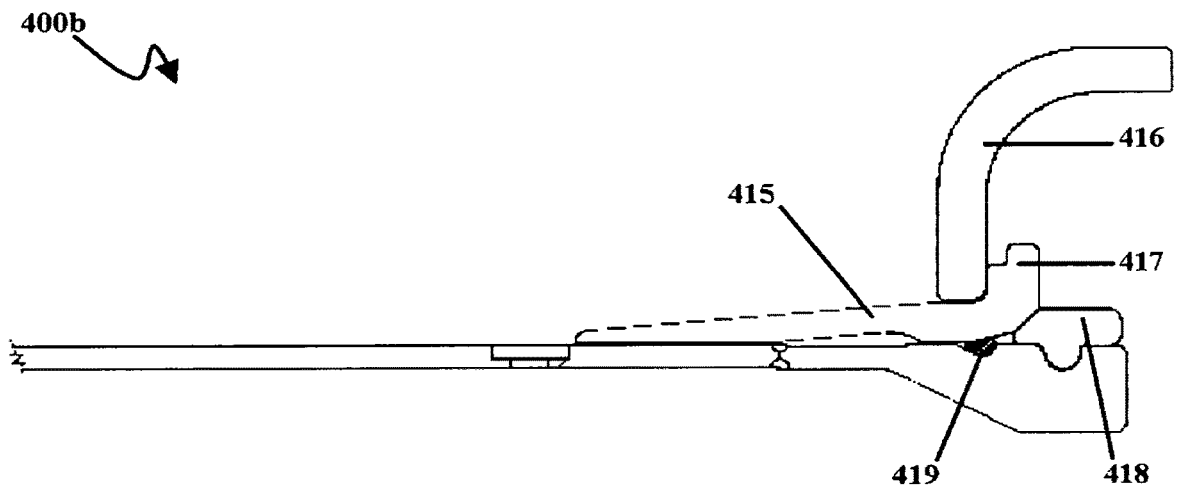
FIG. 4b illustrates an enlarged sectional elevation of outer bead seat band portion of outboard wheel rim of the dual wheel assembly, according to an embodiment therein.

FIG. 4b illustrates an enlarged sectional elevation 400b of outer bead seat band portion of the outboard wheel rim of the dual wheel assembly, according to an embodiment. A bead seat band 415 is provided at the outer end of the outboard wheel rim 420. The bead seat bands at both inner and the outer end of inboard and outboard wheel 215, 204, 412 and 415 are of the same and identical size and is fitted interchangeably to either wheel 201, 401. An annular flange at wheel 417 is projecting radially outwardly from the outer bead seat band 415 to serve as a stopper for a tyre flange 416 at the outer end of the wheel and outer bead of the tyre 402. An O-ring 419 of outboard wheel is located in the groove to provide air tight seal between bead seat band 415 and outboard wheel rim 420. A lock ring 418 is mounted to the outer end of the wheel rim 420 to retain the outer bead seat band 415 on the outboard wheel rim 420.

Figure 5:
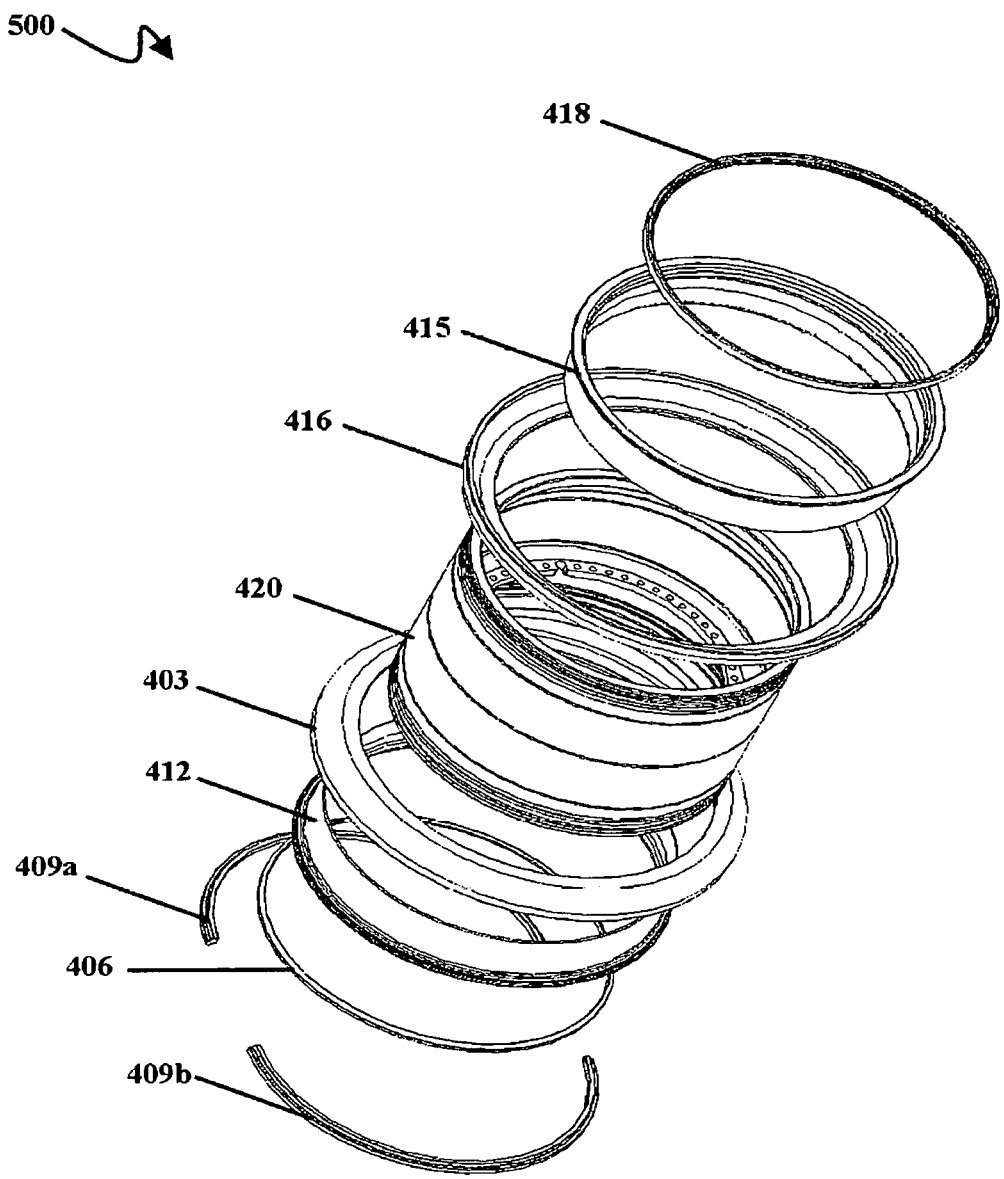
FIG. 5 illustrates an exploded view of outboard wheel rim of the dual wheel assembly, according to an embodiment therein.

FIG. 5 illustrates an exploded view 500 of the outboard wheel rim of the dual wheel assembly, according to an embodiment. The outboard wheel rim 420 of the wheel 401 is generally of cylindrical shape. Grooves for O-ring and lock rings are machined in the front and rear end of the rim.

In accordance to an embodiment, the inboard wheel assembly is done by the following steps; wherein the inboard wheel rim 206 is mounted on to the inboard face of the axle hub 301. The inboard wheel rim 206 is secured to the axle hub 301 by using multiple fasteners. The inboard wheel rim 206 includes an inflation valve and its spud. The outboard wheel rim 420 is mounted onto the outboard face of the axle hub 301. The outboard wheel rim 420 is secured to the axle hub 301 by using multiple fasteners. The outboard wheel rim 420 includes the inflation valve and its spud. The inner tyre flange 212 of the wheel is positioned on the inboard wheel rim 206. The tyre 202 is placed on the inboard wheel rim 206. The outer tyre flange 203 of the inboard wheel is placed over the tyre 202. The removable bead seat band 204 of the wheel is inserted through the gap between the tyre 202, tyre flange 212 and the inboard wheel rim 206. The removable bead seat band 204 of the inboard wheel is pushed inwardly to expose the groove for O-ring 213. The O-ring 213 is placed over the groove. The split lock ring 205 is disposed of in the groove provided on the inboard wheel rim 206.

According to an embodiment, the outboard tyre can be assembled by the following method. The two-piece saddle lock ring 409a, 409b are placed on the inner lock ring groove 414 of the outboard wheel rim 420. The two-piece segmented saddle lock rings are held in position on the groove by using the shoulder 407 and the endless ring 406 is placed over the two-piece segmented saddle lock rings 409a and 409b. The endless ring 406 is pressed over the lock rings so as to retain the lock rings till the tyre assembly is completed. The O-ring 410 is disposed on the inner groove of the wheel rim 420. The removable bead seat band 412 is placed over the wheel rim 420 and pressed against the taper of the endless ring 406. The inner tyre flange 403 is placed over the bead seat band 412. The tyre 402 is placed over the wheel rim 420. The outer tyre flange 416 is placed on the outboard wheel rim 420. Then the bead seat band 415 is inserted through the gap between tyre 402, tyre flange 416 and wheel rim 420. The bead seat band 415 is pushed over inwardly to expose the groove for O-ring 419. The O-ring 419 is placed over the groove. Finally, the lock ring 418 is disposed of in the groove provided on the wheel rim. When the tyre is inflated, it expands sideways, causing the tyre beads and the tyre flanges to move axially outwardly and sit on the respective bead seat bands in a tight fit. This expansion also causes the bead seat bands to move outwardly to abut against the end flange and locking ring respectively.

According to an embodiment, to remove the tyres from the wheel rims, the above procedure is reversed. It will be noted that the tyre 402 is removed from the rim 420 without removing the rim from the hub 301. Before removal of tyres, both tyres are deflated completely. To ensure complete removal of air, valve core is also removed from both the wheels. The lock ring 418 is removed from the outboard wheel 401. In practice, the tyre flange 416, bead seat band 415 at the outer end of the outboard wheel and the tyre flange 403, bead seat band 412 at the inner end of the outboard wheel may already be held with the tyre. Hence, all these components along with the tyre 402 can be removed from the wheel rim 420. An external force is applied by inserting a suitable tool in the prying slots 422 provided on the endless ring 406 to remove from the wedge lock over the self-locking taper 413 of the two-piece segmented saddle lock rings 409a and 409b. While dislodging the endless ring from the taper lock, the lock rings are held using the shoulder 407 to avoid falling off the two-piece segmented saddle lock rings 409a and 409b from the groove. After removal of the endless ring the two-piece saddle lock ring 409a, 409b can be removed sideways from the wheel rim 420. With the outboard wheel rim, 420 held on the axle hub 301, the inboard tyre can be removed. The lock ring 205 for the inboard wheel rim 206 is removed. As explained earlier, the inner tyre 202 along with tyre flanges 212, 203 and bead seat band 204, 215 can be removed by passing over the outboard wheel rim 420.

According to an embodiment, the present invention has many advantages. That is the outer tyre can be mounted and demounted without removing wheel rim from the axle hub. The inner tyre can be mounted and demounted without removing the outboard wheel rim from the hub. The inventory of tyre support components can be greatly reduced. Further, the bead seat bands can be identical and interchangeable between wheel rims for dual wheel assembly. Similarly, the tyre flanges can be identical and interchangeable between wheel rims. Further, the lock rings can also be identical and interchangeable between the wheel rims.

According to an embodiment, the two wheel rims may be of the same diameter and there may not be any reduction in outboard wheel rim diameter, the larger ring gear of final planetary drive may also be possible and hence higher rim pull at machine level can be achievable. It can be known from the embodiments that there is no need of fasteners for holding the two-piece segmented lock rings. The endless ring retaining the two-piece segmented saddle lock rings due to wedge action of self-locking taper cannot move from its position until an external force is applied on the endless ring towards the direction of the tyre position. The endless ring may act as a hood over the two-piece segmented saddle lock rings and can prevent any loose parts flying off the rim during the tyre burst.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A rear dual wheel assembly with a novel self-locking mechanism, in a heavy transport vehicle, comprises:
   a common axle hub, an inboard wheel assembly and an outboard wheel assembly at each side of the heavy transport vehicle;
   wherein each outboard wheel assembly comprises:
   a knave for connecting a wheel rim to the axle hub;
   a removable bead seat in an axial outer and an axial inner portion of the outboard wheel;
   an endless ring in the axial inner portion;
   a two-piece segmented saddle lock ring in the axial inner portion;
   a split lock ring in the axial outer portion;
   a tyre flange at both the axial outer and the axial inner portion;
   an O-ring at the axial inner and the axial outer portion of the outboard wheel; and
   an inner surface of the endless ring is provided with a taper that is pressed against a taper provided on the two-piece segmented saddle lock ring;
   wherein each inboard wheel assembly comprises:
   a knave for connecting a wheel rim to the axle hub;
   a removable bead seat in an axial outer portion of the inboard wheel;
   a fixed bead seat in an axial inner portion of the inboard wheel;
   a split lock ring;
   a tyre flange at both the axial outer and the axial inner portion;

an annular flange at the axial inner portion;

an O-ring at the axial outer portion of the inboard wheel;

the endless ring retaining the two-piece segmented saddle lock ring due to wedge action of the taper moving from its position when an external force is applied on the endless ring towards direction of a tyre; and wherein the endless ring acting as a hood over the two-piece segmented saddle lock ring and preventing loose parts flying off the rim during a tyre burst.

2. The rear dual wheel assembly of claim 1, the axial inner portion of the outboard wheel assembly provided with an annular groove or a gutter section according to the shape of the two-piece segmented saddle lock ring.

3. The rear dual wheel assembly of claim 1, the removable bead seat at the axial inner portion of the outboard wheel is provided with a taper of approximately 45 degrees that abuts against a matching taper provided on an outer surface of the endless ring in the axial inner portion of the outboard wheel assembly.

4. The rear dual wheel assembly of claim 1, the two-piece segmented saddle type lock ring provided with a shoulder in such a way extending axially inwardly from the outer surface of the two-piece segmented saddle lock ring for holding the two-piece segmented saddle lock ring during disassembly.

5. The rear dual wheel assembly of claim 1, the removable bead seats, the lock rings, the tyre flanges are identical and interchangeable between the wheel rims for dual wheel assembly.

\* \* \* \* \*